United States Patent
Wang et al.

(10) Patent No.: US 7,635,157 B2
(45) Date of Patent: Dec. 22, 2009

(54) VEHICLE HOOD ASSEMBLY WITH RIPPLED CUSHION SUPPORT

(75) Inventors: Jenne-Tai Wang, Rochester, MI (US); Bing Deng, Rochester Hills, MI (US); Qing Zhou, Beijing (CN); Qi Liu, Beijing (CN); Yong Xia, Beijing (CN)

(73) Assignee: GM Global Technology Operation, INC, Detroit, MI (US)

( * ) Notice: Subject to any disclaimer, the term of this patent is extended or adjusted under 35 U.S.C. 154(b) by 283 days.

(21) Appl. No.: 11/853,238

(22) Filed: Sep. 11, 2007

(65) Prior Publication Data

US 2009/0065277 A1    Mar. 12, 2009

(51) Int. Cl.
    *B62D 25/10* (2006.01)
(52) U.S. Cl. ............... 296/193.11; 52/783.17; 52/783.19; 180/69.2
(58) Field of Classification Search .............. 52/783.14, 52/783.17, 783.19; 180/69.2, 69.21; 296/187.04, 296/187.09, 191, 193.09, 193.11, 203.02; 428/182
    See application file for complete search history.

(56) References Cited

U.S. PATENT DOCUMENTS

| | | | |
|---|---|---|---|
| 1,925,453 A * | 9/1933 | Mazer | 181/290 |
| 3,094,350 A * | 6/1963 | Cusick | 296/97.23 |
| 3,674,620 A * | 7/1972 | McCarthy et al. | 428/114 |
| 4,035,539 A * | 7/1977 | Luboshez | 428/178 |
| 4,097,958 A * | 7/1978 | Van Dell | 16/225 |
| 4,136,630 A * | 1/1979 | Fraser | 114/102.27 |
| 4,886,696 A * | 12/1989 | Bainbridge | 428/184 |
| 4,950,522 A | 8/1990 | Vogt et al. | |
| 5,048,877 A | 9/1991 | Rogers, Jr. et al. | |
| 5,182,158 A * | 1/1993 | Schaeffer | 428/178 |
| 5,290,622 A * | 3/1994 | Tanabe | 428/182 |
| 5,682,667 A * | 11/1997 | Flagg | 29/460 |

(Continued)

FOREIGN PATENT DOCUMENTS

GB    2186235 A *  8/1987

(Continued)

OTHER PUBLICATIONS

Koki Ikeda et al., Development of Aluminum Hood Structure for Pedestrian Protection, Oct. 29, 2003.

(Continued)

*Primary Examiner*—Glenn Dayoan
*Assistant Examiner*—Paul A Chenevert
(74) *Attorney, Agent, or Firm*—Quinn Law Group, PLLC

(57) ABSTRACT

An energy-absorbing hood assembly for a vehicle includes an inner layer operatively secured to an upper layer having a first interface surface. The inner layer has opposing first and second surfaces defining a sinusoidal profile that is oriented to extend from the forward end of the vehicle towards the rearward end of the vehicle. The sinusoidal profile includes varying amplitudes and wavelengths along different regions of the hood assembly. The amplitudes and wavelengths are individually configured to provide regionally distinct predetermined levels of absorption and attenuation of kinetic energy imparted to the hood assembly by an object upon impact therebetween. Preferably, the hood assembly also includes a lower layer having a second interface surface; wherein the inner layer has a plurality of bonding surfaces attached to the first and second interface surfaces to thereby define a plurality of laterally oriented channels.

22 Claims, 2 Drawing Sheets

U.S. PATENT DOCUMENTS

| | | | | |
|---|---|---|---|---|
| 5,791,118 | A * | 8/1998 | Jordan | 52/783.11 |
| 5,967,573 | A | 10/1999 | Wang | |
| 6,179,364 | B1 * | 1/2001 | Takahashi | 296/76 |
| 6,290,272 | B1 * | 9/2001 | Braun | 293/120 |
| 6,302,458 | B1 | 10/2001 | Wang et al. | |
| 6,401,565 | B1 | 6/2002 | Wang et al. | |
| 6,415,882 | B1 | 7/2002 | Schuster et al. | |
| 6,439,330 | B1 | 8/2002 | Paye | |
| 6,513,617 | B2 | 2/2003 | Sasaki et al. | |
| 6,641,166 | B2 | 11/2003 | Browne et al. | |
| 6,813,562 | B2 | 11/2004 | Altan et al. | |
| 6,883,627 | B1 | 4/2005 | Staines et al. | |
| 6,939,599 | B2 * | 9/2005 | Clark | 428/178 |
| 7,055,894 | B2 | 6/2006 | Ikeda et al. | |
| 7,090,289 | B2 | 8/2006 | Koura | |
| 7,114,765 | B2 | 10/2006 | Ishikawa et al. | |
| 7,140,673 | B2 | 11/2006 | Ito et al. | |
| 7,150,496 | B2 | 12/2006 | Fujimoto | |
| 7,399,028 | B1 * | 7/2008 | Castillo et al. | 296/193.11 |
| 7,467,680 | B2 * | 12/2008 | Mason | 180/69.2 |
| 7,488,031 | B2 * | 2/2009 | Ishitobi | 296/193.11 |
| 7,497,507 | B2 * | 3/2009 | Matsushima et al. | 296/193.11 |
| 2002/0003054 | A1 * | 1/2002 | Kamada et al. | 180/69.2 |
| 2002/0189195 | A1 * | 12/2002 | McKague et al. | 52/783.19 |
| 2003/0121710 | A1 * | 7/2003 | Hamada et al. | 180/274 |
| 2005/0001453 | A1 * | 1/2005 | Endo et al. | 296/193.11 |
| 2005/0023059 | A1 * | 2/2005 | Kamada et al. | 180/69.21 |
| 2005/0057076 | A1 * | 3/2005 | Roux et al. | 296/198 |
| 2006/0163915 | A1 | 7/2006 | Ikeda et al. | |
| 2006/0202492 | A1 * | 9/2006 | Barvosa-Carter et al. | 293/107 |
| 2006/0220418 | A1 * | 10/2006 | Behr et al. | 296/187.04 |
| 2007/0063544 | A1 * | 3/2007 | Browne et al. | 296/187.09 |
| 2007/0132279 | A1 * | 6/2007 | Donabedian et al. | 296/193.11 |
| 2008/0088154 | A1 * | 4/2008 | Rocheblave et al. | 296/187.04 |
| 2008/0122261 | A1 * | 5/2008 | Seo | 296/193.11 |
| 2008/0191518 | A1 * | 8/2008 | Maruyama et al. | 296/203.02 |
| 2008/0315626 | A1 * | 12/2008 | Lutter et al. | 296/187.04 |
| 2009/0025995 | A1 * | 1/2009 | Wang et al. | 180/69.2 |

FOREIGN PATENT DOCUMENTS

| | | | |
|---|---|---|---|
| JP | 54028373 | A * | 3/1979 |
| JP | 59156872 | A * | 9/1984 |
| JP | 61150824 | A * | 7/1986 |
| JP | 62026170 | A * | 2/1987 |
| JP | 62085767 | A * | 4/1987 |
| JP | 02208174 | A * | 8/1990 |
| JP | 03054079 | A * | 3/1991 |
| JP | 05278637 | A * | 10/1993 |

OTHER PUBLICATIONS

J.T. Wang et al., Math-Based Performance Evaluation of an Experimental Car-Frontal Impact Crashworthiness, ASME 2002 Design Engineering Technical Conferences and Computers and Information Engineering Conference, Sep. 29-Oct. 2, 2002, at 2-3, Montreal, Canada.

* cited by examiner

VEHICLE HOOD ASSEMBLY WITH RIPPLED CUSHION SUPPORT

TECHNICAL FIELD

The present invention relates generally to vehicle front structures, and more specifically to energy-absorbing engine compartment hoods for increasing the deceleration of an object and reducing resultant forces transmitted thereto by the engine compartment hood upon impact therebetween, thereby minimizing the stopping distance of the object.

BACKGROUND OF THE INVENTION

Automotive vehicle bodies are typically constructed using stamped metal panels, which combine substantial overall strength and stiffness with a smooth, paintable exterior surface. With specific regard to vehicle hood panels (also referred to in the art as engine compartment hoods or bonnet structures), panel stiffness is often satisfied via the combination of a relatively high strength stamped metal outer or upper surface, referred to as an "A-surface", coupled with a preformed inner or lower surface, referred to as a "B-surface", supported by a series of engine-side or hat-section reinforcements. The hat-section reinforcements are typically positioned between the A- and B-surfaces of the hood, and include a pair of upper flanges oriented toward the A-surface as well as a single lower flange oriented toward the B-surface, with the upper and lower flanges interconnected by a web portion. This conventional hood construction increases the bending stiffness of the hood by placing relatively stiff material, usually stamped steel, as far away as possible from the neutral axis of bending of the hood.

In certain vehicle impact scenarios, an object may exert a downward force on the vehicle hood. Typically, vehicle hoods are deformable when a downward force is exerted thereto. However, the deformability of the hood and, correspondingly, the hood's ability to absorb energy may be impeded by the proximity of the hood to rigidly mounted components housed in the vehicle's engine (or forward) compartment. By way of example, the hood's ability to absorb energy through deformation can be significantly impeded where the hood and engine block are in close proximity. However, minimal clearance between the vehicle hood and the engine compartment components may provide significant benefits, such as improved driver visibility, increased aerodynamics, and more aesthetic appeal.

In contrast, additional clearance between the vehicle hood and engine compartment can increase the hood's ability to absorb energy when acted upon with a downward force. Therefore, notwithstanding other design concerns, it can also be advantageous to increase the clearance between the vehicle hood and the components housed in the engine compartment.

SUMMARY OF THE INVENTION

An energy-absorbing vehicle hood assembly having a rippled cushion support is provided, offering improved crush performance and more uniform kinetic energy absorption. The improved and more uniform crush characteristics of the present hood assembly ensure a compliant surface when subjected to a crush load upon impact with a foreign object. As such, the present design maximizes the hood assembly's ability to absorb and attenuate kinetic energy imparted thereto, and thereby minimize the required stopping distance of the object. In addition, the orientation, regional variation, and design of the rippled cushion support improves vehicle crashworthiness in frontal impact scenarios—reducing dash panel intrusion and effective vehicle acceleration. The hood assembly and rippled cushion support also provides a relatively high bending stiffness, enabling sufficient rigidity and stability when the vehicle is in normal operation, rendering the present hood assembly resistant to flutter or shake dynamics that may occur at high vehicle speeds, and sufficiently resilient to meet standard performance requirements.

According to one aspect of the present invention, an energy-absorbing hood assembly is provided for use with a motorized vehicle having vehicle structure with a forward and a rearward end. The hood assembly is mounted, secured, or attached to the vehicle structure proximate to the forward end, and includes an upper layer and an inner layer. The inner layer has substantially opposing first and second surfaces defining a sinusoidal profile. The inner layer is attached, secured, or adhered to the upper layer to thereby position or orient the sinusoidal profile to extend from the forward end towards the rearward end of the vehicle structure. The sinusoidal profile includes a first amplitude and a first wavelength along a first region of the hood assembly, and a second amplitude and a second wavelength along a second region of the hood assembly. The first amplitude and wavelength are each configured to provide a first predetermined level of absorption and attenuation of kinetic energy imparted to the hood assembly by an object upon impact therebetween, whereas the second amplitude and wavelength are each configured to provide a second predetermined level of absorption and attenuation of kinetic energy imparted to the hood assembly by the object upon impact therebetween. To this regard, the first and second wavelengths are preferably each approximately 30 to 165 millimeters, and the first and second amplitudes are preferably each approximately 5 to 30 millimeters.

Ideally, the sinusoidal profile further includes a third amplitude and a third wavelength along a third region of the hood assembly that is different from the first and second regions. The third amplitude and wavelength are each configured to provide a third predetermined level of absorption and attenuation of kinetic energy imparted to the hood assembly by the object upon impact therebetween. It is even further preferred that the sinusoidal profile includes a variable amplitude and a variable wavelength along a fourth region of the hood assembly. The variable amplitude and wavelength are each configured to provide varying levels of absorption and attenuation of kinetic energy imparted to the hood assembly by the object upon impact therebetween.

In another aspect of the invention, a hood assembly is provided for use with a motorized vehicle. The hood assembly includes an upper layer having a first interface surface, and an inner layer having substantially opposing first and second surfaces defining a sinusoidal profile. The first and second surfaces of the inner layer also respectively define a first and a second plurality of bonding surfaces. The first plurality of bonding surfaces is secured, attached, or adhered to the first interface surface of the upper layer to thereby define a first plurality of channels oriented laterally with respect to the vehicle. The sinusoidal profile includes a first amplitude and a first wavelength along a first region of the hood assembly, and a second amplitude and a second wavelength along a second region of the hood assembly. The first amplitude and wavelength are each configured to provide a first predetermined level of absorption and attenuation of kinetic energy imparted to the hood assembly by an object upon impact therebetween, whereas the second amplitude and wavelength are each configured to provide a second predetermined level of absorption and attenuation of kinetic energy imparted to the hood assembly by the object upon impact therebetween. To this regard, the first and second wavelengths are preferably each approximately 30 to 165 millimeters, and the first and second amplitudes are preferably each approximately 5 to 30 millimeters.

Preferably, the hood assembly described above also includes a lower layer having a second interface surface, wherein the second plurality of bonding surfaces of the inner layer is attached, secured, or adhered to the second interface surface to thereby define a second plurality of channels oriented laterally with respect to the vehicle. Optimally, the inner layer is configured to controllably deform at a first threshold crush load imparted to the hood assembly by the object upon impact therebetween. In a similar respect, the lower layer is preferably configured to controllably fail at a second threshold crush load imparted to the hood assembly by the object upon impact therebetween. The two layers, i.e., the lower and inner layers, can be configured to controllably fail or deform, respectively, through the addition of precuts or inclusions thereto. Preferably, the upper layer, lower layer, and inner layer are each fabricated either from a metallic material or a plastic.

According to yet another aspect of the invention, a vehicle is provided having a vehicle body that defines a front compartment, and a hood assembly configured to extend over and above the vehicle front compartment. The hood assembly is composed of a hood outer panel, an upper layer, a lower layer, and an inner layer. The upper layer is attached, secured, or adhered to an inner surface of the hood outer panel. Alternatively, the hood outer panel and upper layer can be preformed as a single unitary member. The inner layer has substantially opposing first and second surfaces that define a sinusoidal profile. The first and second surfaces also respectively define a first and a second plurality of bonding surfaces. The first plurality of bonding surfaces is attached, secured, or adhered to a first interface surface of the upper layer, and the second plurality of bonding surfaces is operatively attached, secured, or adhered to a second interface surface of the lower layer, thereby respectively defining a first and a second plurality of channels oriented laterally with respect to the vehicle. Ideally, the first, second, and third wavelengths are each approximately 30 to 165 millimeters, and the first, second, and third amplitudes are each approximately 5 to 30 millimeters Preferably, the sinusoidal profile defines a first amplitude and a first wavelength along a first region of the hood assembly, a second amplitude and a second wavelength along a second region of the hood assembly, and a third amplitude and a third wavelength along a third region of the hood assembly. The first amplitude and wavelength, second amplitude and wavelength, and third amplitude and wavelength are each configured to provide regionally distinct predetermined levels of absorption and attenuation of kinetic energy imparted to the hood assembly by an object upon impact therebetween.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Figure 1:
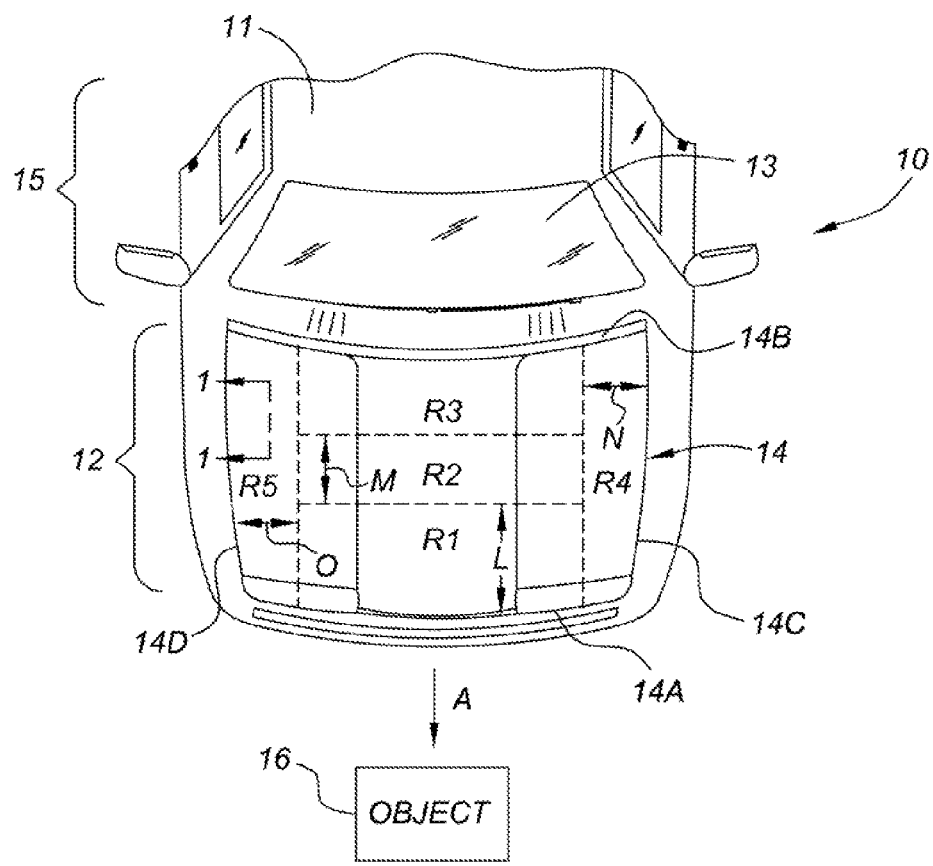
FIG. 1 is a plan perspective view showing an exemplary motor vehicle having mounted thereto an energy-absorbing hood assembly with a rippled cushion support according to the present invention.

Referring to the Figures, wherein like reference numbers refer to the same or similar components throughout the several views, FIG. 1 is a plan view of an exemplary motor vehicle, identified generally as 10, having a vehicle body 11 that includes a moveable or actuatable energy-absorbing vehicle hood assembly (hereinafter "hood assembly 14") spanning or covering an engine compartment 12 forward of a passenger compartment 15. Although the vehicle 10 is depicted in FIG. 1 as a standard coupe-type passenger car, the hood assembly 14 can be incorporated into any vehicle platform, such as sedan-type passenger cars, light trucks, heavy duty vehicles, etc.

Figure 2:
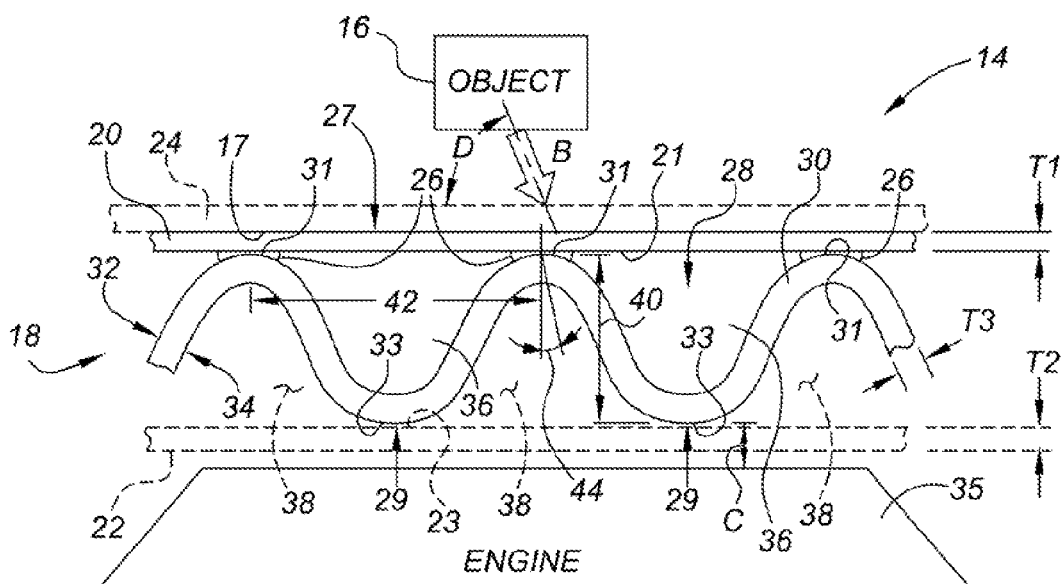
FIG. 2 is a side-schematic view a portion of the energy-absorbing hood assembly with rippled cushion support taken along line 1-1 of FIG. 1 in accordance with a preferred embodiment of the present invention.

The hood assembly 14 is operatively attached, secured, or mounted to the vehicle body 11, for example, by one or more peripheral hinges (not shown) positioned adjacently to a windshield 13. Ideally, the hood assembly 14 is sufficiently sized and shaped to provide a closure panel suitable for substantially covering and protecting various vehicular components contained within the engine compartment 12, including, but not limited to, propulsion system components, steering system components, braking system components, and heating, ventilation, and air conditioning (HVAC) system components, all of which are represented collectively herein as engine 35, as seen in FIGS. 2-2B. The term "engine" or "engine compartment" is not considered limiting with respect to the nature or type of propulsion system employed by the vehicle 10. Thus, within the scope of the claimed invention, the vehicle 10 may employ any propulsion system, such as a conventional internal combustion engine, an electric motor, a fuel cell, a hybrid-electric system, etc. As represented in FIG. 1, vehicle 10 may move or travel in the direction of arrow A toward an object 16, positioned external to vehicle 10, in such a manner that the object 16 impacts the hood assembly 14 in a substantially downward direction during a collision therebetween, thereby subjecting the hood assembly 14 to various stresses, forces, and/or loads, as described hereinbelow with reference to FIGS. 2-2B.

A representative side view of the hood assembly 14, taken along line 1-1 of FIG. 1, is provided in FIG. 2 to illustrate the rippled cushion support structure (hereinafter "cushion support 18") according to a preferred embodiment of the present invention. The cushion support 18 includes an upper layer or outer skin 20 and an inner layer 30. The inner layer 30 has substantially opposing first and second surfaces 32, 34, respectively, that define a rippled or sinusoidal profile, indicated generally as 28. The inner layer 30 is attached, secured, or adhered to the upper layer 20 to thereby position or orient the sinusoidal profile 28 to extend from a front end towards a rear end of the vehicle 10, e.g., from the forward edge 14A towards rearward edge 14B of the hood assembly 14, as seen in FIG. 1.

The upper layer 20 is intended as the outer-most member of the hood assembly 14, the upper layer 20 therefore including a customer-visible "A-surface" 27. Correspondingly, the inner layer 30 is intended as the inner-most member of the hood assembly 14; thus, the second surface 34 of the inner layer 30 can be considered an engine-side "B-surface" 29. Alternatively, the cushion support 18 can include a lower layer or inner skin, shown hidden in FIG. 2 as 22, to act as the inner-most member of the hood assembly 14. In a similar respect, the upper layer 20 can be attached, secured, or adhered to an inner surface 17 of a hood outer panel, shown hidden in FIG. 2 as 24. Alternatively, the hood outer panel 24 and upper layer 20 can be preformed as a single, unitary member.

A first 31 and second 33 plurality of bonding surfaces are respectively defined along the various peaks (crests) and valleys (hollows) of the sinusoidal profile 28. The inner layer 30 is preferably secured, e.g., by adhesive, fastening, welding, or the like (represented generally as 26 in FIG. 2), to the upper layer 20 at a first interface surface 21 via the first plurality of bonding surfaces 31 to form a first plurality of channels 36, oriented laterally relative to the vehicle body 11—i.e., the hollows and crests of the sinusoidal profile 28 run across the vehicle 10 in the horizontal direction from left to right. Similarly, if the lower layer 22 is incorporated into the hood assembly 14, the inner layer 30 is preferably secured to the lower layer 22 at a second interface surface 23 via the second plurality of bonding surfaces 33 to form a second plurality of channels 38, oriented laterally relative to the vehicle body 11. Alternatively, the entire cushion support 18, i.e., upper, lower, and inner layers 20, 22, 30 can be manufactured by extrusion or other molding method in mass production, thereby eliminating the need for the first and second bonding surfaces 31, 33 and first and second interface surfaces 21, 23. In a similar respect, the inner layer 30 may be attached, mounted or secured to the upper layer 20 and lower layers 22, where included, by any means known in the art without departing from the scope of the claimed invention. If adhesive is used as the mounting method for connecting the inner layer 30 to the upper layer 20 and lower layer 22, where included, the first and second pluralities of bonding surfaces 31, 33 should have a substantially flat portion (not shown) for better gluing effect.

Ideally, the cushion support 18 extends so as to cover substantially the entire inner surface 17 of the hood outer panel 24. On the other hand, the cushion support 18 can be fabricated and secured in such a manner so as to cover only certain portions of the inner surface 17 of the hood outer panel 24. As will be described in detail hereinbelow, the cushion support 18 is broken into several segments or regions (e.g., regions R1-R5 of FIG. 1). The configuration of each cushion support region R1-R5 is individually tailored or engineered to accommodate the curvature of the hood outer panel 24, to meet local and global crush performance and vehicle crashworthiness requirements, to address packaging limitations caused by the under-hood components (e.g., engine 35), and other vehicle performance constraints.

Ideally, the upper, lower, and inner layers 20, 22, 30 are each one-piece plate or sheet members preferably preformed using such methods as stamping, hydroforming, quick plastic forming, or superplastic forming. It is further preferred that the various layers, e.g., 20, 22, 30, be individually contoured—e.g., the upper layer 20 is preformed with contours for aesthetic appeal or for improved bonding to the inner surface 17 of the hood outer panel 24, while the inner layer 30 and lower layer 22, where included, are preformed with differing geometric parameters to accommodate, among other things, the under hood components, such as engine 35, and to meet crush performance and vehicle crashworthiness requirements. In the alternative, it is also within the scope of the claimed invention that the upper, lower, and inner layers 20, 22, 30 individually or collectively consist of multiple plate members, include rounded or beveled edges and corners, have varying geometric configurations, or have complementary profiles.

The cushion support 18 is preferably fabricated from metal, plastic, composite materials (e.g., fiberglass), or other materials of suitable strength and resilience for the intended purpose of the hood assembly 14. By way of example, the upper, lower, and inner layers 20, 22, 30 may all be fabricated from a plastic, such as Polymethyl methacrylate (PMMA) or bulk mold compound (BMC), of approximately 0.3 to 2.8 millimeters (mm) in thickness T1, T2, T3, respectively. Alternatively, the upper, lower, and inner layers 20, 22, 30 may be fabricated from metal plates, such as cold rolled steel, hot dipped galvanized steel, stainless steel, aluminum, and the like, of approximately 0.3 to 1.9 mm in thickness T1, T2, T3, respectively. However, other values for the thicknesses T1, T2, T3 of the upper, lower, and inner layers 20, 22, 30 may be usable within the scope of the present invention. The various layers 20, 22, 30 of the hood assembly 14 are preferably finished with an anti-corrosive, highly durable coating (e.g., zinc plating). A compressible, energy-absorbing foam material (not shown), such as polyurethane foam, polystyrene foam, and/or other similar materials or combination of such materials, may be utilized to fill the channels 36, 38.

According to the embodiment of FIG. 2, the first and second surfaces 32, 34 of the inner layer 30 define a sinusoidal profile 28. As used herein, the term "sinusoidal" should be defined or interpreted to mean a repeating, propagating geometric shape substantially resembling a mathematic sine-curve, having a plurality of peaks and valleys. To this regard, the sinusoidal profile 28 has an amplitude 40 (often referred to in the art as the peak-to-peak amplitude) and a wavelength 42. The amplitude 40 is a metric representing the sum-total magnitude of propagation of the sinusoidal profile 28. The wavelength 42, as shown in FIG. 2, is the distance between repeating units of the sinusoidal profile 28, e.g., from peak to peak or from valley to valley.

The inner layer 30 has various structural characteristics, including, but not limited to, geometric characteristics—such as amplitude 40, wavelength 42, ripple offset angle 44, and thickness T3, and material characteristics—such as elastic modulus, yield strength, and density, which may be selected to provide a predetermined and substantially constant or uniform "crush performance" for a given threshold crush load. More specifically, with reference to FIG. 2, as the object 16 impacts the A-surface 27 of the upper layer 20 (or hood outer panel 24, depending upon the particular configuration) the actual and relative mass, velocity, and acceleration of object 16 and vehicle 10 (see FIG. 1) combine to generate a crush load (represented generally by arrow B) in a downward direction, e.g., at an impact angle D (see FIG. 2). The crush load B therefore is directed from the upper layer 20 toward the inner layer 30, and has a specific magnitude. The characteristics of the cushion support 18, e.g., amplitude 40, wavelength 42, ripple offset angle 44, and thickness T3, FIG. 2, and material properties, e.g., modulus, yield strength, and density, can be selectively modified, individually or collectively, to provide a predetermined initial stiffness, together with the upper layer 20, to generate a substantially large and immediate initial deceleration of the colliding object 16.

Optimally, the cushion support 18 would replace the structural functions of the lower layer 22 and provide any necessary reinforcement for the hood outer panel 24. For example, the cushion support 18, together with an adhesive (e.g., attachment means 26 of FIG. 2), acts as an added mass to the hood assembly 14, the inertial effect of such added mass promoting deceleration of the object 16 in the early stages of the vehicle-object collision. However, lower layer 22 may be included in the embodiment of FIG. 2 to provide additional reinforcement and support for the hood assembly 14.

The upper layer 20 and, where included, lower layer 22 and hood outer panel 24 may be engineered, individually or collectively, by virtue of each member's geometry and elasticity, so the hood assembly 14 has a relatively high tensile and compressive strength or stiffness to provide a preferred performance, while still maintaining a relatively low failure or threshold crush strength permitting a particular failure response or crush performance when the hood assembly 14 is subjected to crush load B. Ideally, the threshold crush strength is set at a level sufficient to permit contact with various small stones, hail, minor debris, or other such representative objects commonly encountered during ordinary roadway operation, to enable the hood assembly 14 to be utilized in a wide range of driving conditions without fracturing or failing.

Figure 2A:
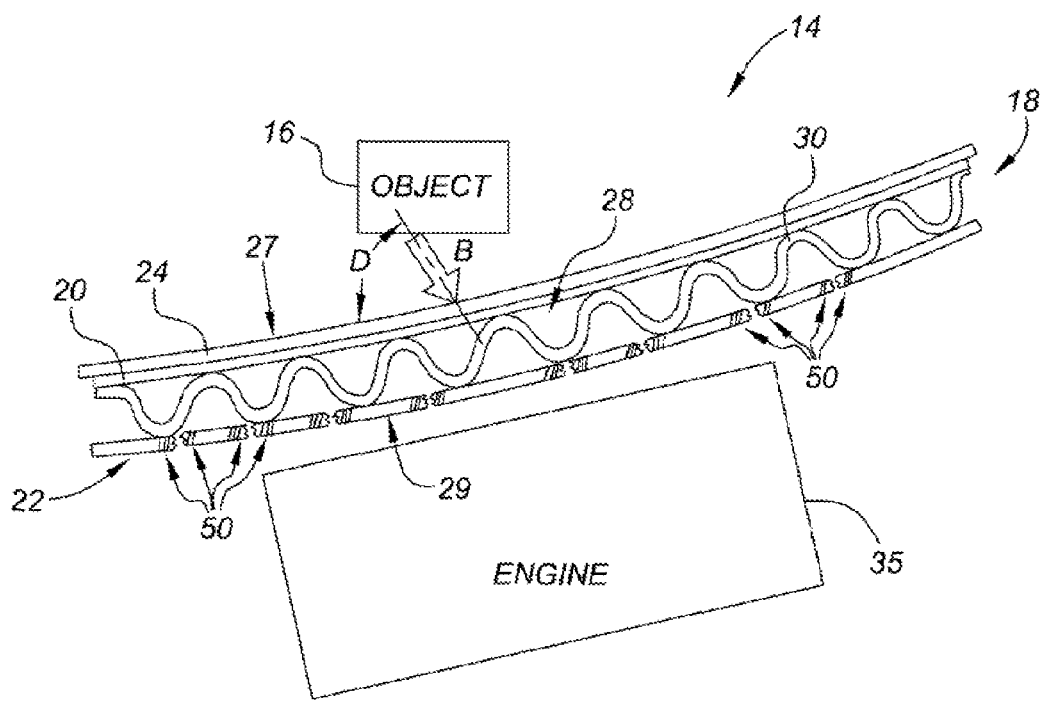
FIG. 2A is a representative side-schematic view of the hood assembly of FIG. 2 upon initial impact with an object illustrating controlled deformation and failure of a lower layer mounted thereto.
Figure 2B:
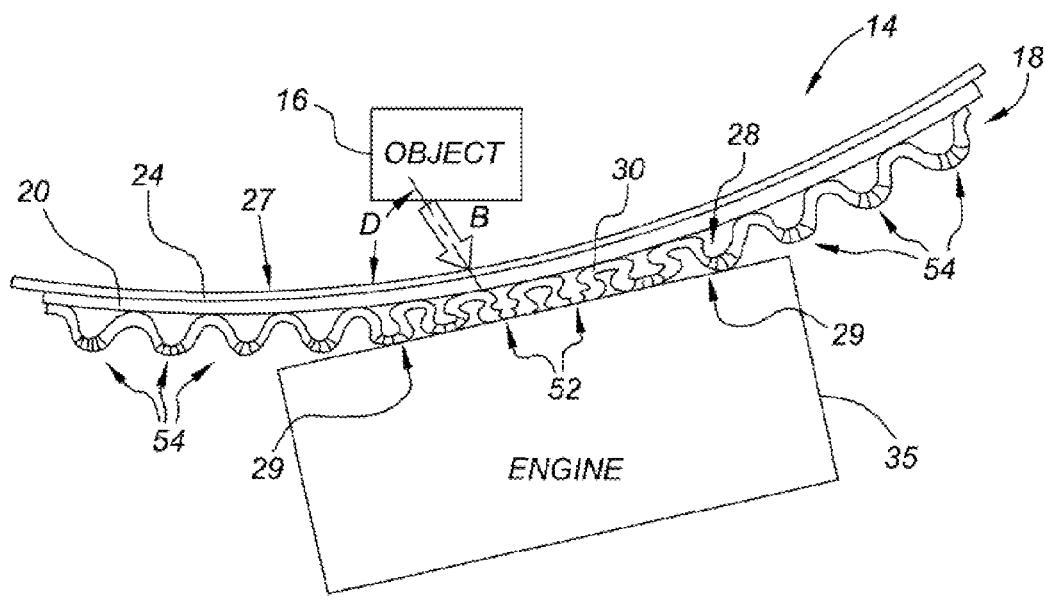
FIG. 2B is a representative side-schematic view of the hood assembly of FIG. 2 shortly after initial impact with an object illustrating controlled deformation and failure of the rippled cushion support.

Looking now at FIG. 2A, the cushion support 18, besides adding to the initial stiffness of the hood assembly 14, is designed to trigger local deformation of the inner layer 30 and local rupture or failure of the lower layer 22 during the initial impact of the object 16 with the hood assembly 14. For example, deformation of the hood outer panel 24 during collision with an object 16 may induce a deliberate breakdown of the adhesive (not shown) holding the cushion support 18 to the hood outer panel 24. The cushion support 18 is thereafter designed to trigger local deformation (e.g., bending, buckling, or compression) of the lower and inner layers 22, 30 and/or rupture of the lower layer 22 (depicted symbolically in FIG. 2A by the fractured lower layer 22) at a first threshold crush load resulting from the impact of the object 16 with the hood assembly 14.

The separation of the support cushion 18 from the hood outer panel 24 and the local rupture of the lower layer 22 can selectively and controllably reduce the local and global stiffness of the hood assembly 14, resulting in increased absorption of the kinetic energy transferred from the object 16 to the hood assembly 14, thereby maximizing any consumed underhood space, e.g., reducing the clearance C of FIG. 2 between the engine 35 and B-surface 29 required to stop the object 16. Failure of the lower layer 22 can be manipulated by, for example, the addition of pre-cuts or inclusions thereto, depicted collectively as 50. In addition, the angle of each ripple relative to the upper layer 20 i.e., ripple offset angle 44 of FIG. 2, can be modified to effectuate different modes of deformation, e.g., buckling, bending, stretching, and combinations thereof. For example, the ripple offset angle 44 can be changed so that the crests of the ripples are oblique (acute or obtuse) relative to the upper layer 20.

Referring to FIG. 2B, when the object 16 presses downwards, e.g., at an angle D, the hood assembly 14, namely B-surface 29 of the inner layer 30, may contact one or more of the under-hood components, such as engine 35. The inner layer 30 serves as padding in the form of local deformation of the ripples in the sinusoidal profile 28, to absorb residual kinetic energy from the object 16 upon impact with the underhood components. By way of example, the sinusoidal profile 28 is designed to controllably compress at a second threshold crush load upon contact with any of the various under-hood components (e.g., engine 35), as depicted in FIG. 2B. The cushion support 18 may also be configured to trigger local rupture of the inner layer 30 (depicted symbolically in FIG. 2B by fractures 52). Deformation and rupture of the inner layer 30 can be manipulated by, for example, the addition of pre-cuts or inclusions thereto, depicted collectively as 54 in FIG. 2B. In effect, the opposing force imparted to the object 16 by the hood assembly 14 upon a collision therebetween is relatively less variable, and provides a larger initial attenuation of kinetic energy resulting in a reduced residual velocity. This in turn reduces the total distance required for the hood assembly 14 to fully absorb the energy from such a collision and bring the object 16 to a complete stop, thereby minimizing or eliminating contact between the object 16 and any under-hood components (e.g., engine 35).

The hood assembly 14 of the present invention also provides improved vehicle crashworthiness in a frontal impact scenario. More particularly, the cushion support structure 18 offers more efficient energy absorption during a frontal impact by deforming, i.e., bending or buckling, along multiple lines, as opposed to a single line of deformation in traditional engine compartment hoods. In other words, the ability to controllably fold and plastically deform at a plurality of points multiplies the amount of kinetic energy that the hood assembly 14 can absorb and mitigate per unit mass. For example, inclusion of the cushion support 18 into the hood assembly 14 can provide up to a 50% reduction in dash panel intrusion, and a 0.7 gravity (9.807 meters per second per second ($m/s^2$)) decrease in effective vehicle acceleration.

According to FIG. 1, the hood assembly 14 is broken up into as few as two, but preferably five regions R1-R5, respectively. The first R1, second R2, and third R3 regions dissect the hood assembly 14 into a forward region, a middle region, and a rearward region, respectively. In other words, the first region R1 extends from the forward edge 14A of the hood assembly 14 to a distance L extending rearward along the vehicle body 11. In addition, the second region R2 extends from the distance L rearward along the vehicle body 11 a further distance M. The third region R3 extends from the distance M (i.e., a distance L+M from the forward edge 14A of the hood assembly 14) to the rearward edge 14B, as depicted in FIG. 1. The fourth R4 and fifth R5 regions, if included, further dissect the hood assembly 14 into one or more lateral segments. For example, the fourth region R4 extends inward a distance N from a right lateral edge 14C of the hood assembly 14, whereas the fifth region R5 extends inward a distance O from a left lateral edge 14D, also illustrated in FIG. 1. Notably, the dimensions shown in FIG. 1 for regions R1 through R5 are merely exemplary and provided for descriptive purposes; that is, the length and width of the five regions R1-R5 may vary infinitely. Furthermore, more than five regions may be employed, each having identical or differing geometric configurations, without departing from the scope of the claimed invention.

The cushion support 18 is optimized for each respective region R1-R5 independently of the other for impact with objects of varying dimensions and masses in order to maintain a clearance C of preferably less than 85 mm while still meeting all crush performance requirements. In general, it is preferred that the cushion support 18 for the first, second, and third regions R1, R2, R3 (shown in FIG. 1) have an amplitude 40 (FIG. 2) of between 5-30 mm, a wavelength 42 (FIG. 2) of 30-165 mm, a Yield strength of at least 200 MPa, and a Young's Modulus of approximately 30 GPa. The fourth and fifth regions R4 and R5 preferably have no cushion support 18, but rather provide a smooth transition from the regions R1-R3 wherein the upper layer 20 curves with the hood outer panel 24 at the right and left lateral edges 14C, 14D. In addition, the clearance C is preferably no less than 70 mm.

While the best modes for carrying out the invention have been described in detail, those familiar with the art to which this invention relates will recognize various alternative designs and embodiments for practicing the invention within the scope of the appended claims.

The invention claimed is:

1. A hood assembly for use with a motorized vehicle having vehicle structure with forward and rearward ends, the hood assembly being operatively secured to the vehicle structure proximate to the forward end, and comprising:
   an upper layer; and
   an inner layer operatively secured to said upper layer and having substantially opposing first and second surfaces defining a sinusoidal profile;
   wherein said sinusoidal profile is oriented to extend from the forward end of the vehicle structure towards the rearward end of the vehicle structure to thereby improve crashworthiness of the vehicle in a frontal scenario;
   wherein said sinusoidal profile includes a first amplitude and a first wavelength along a first region of the hood assembly, said first amplitude and wavelength each being configured to provide a first predetermined level of absorption and attenuation of kinetic energy imparted to the hood assembly by objects upon impact therebetween;
   wherein said sinusoidal profile further includes a second amplitude and a second wavelength along a second region of the hood assembly different from said first region, said second amplitude and wavelength each being configured to provide a second predetermined level of absorption and attenuation of kinetic energy imparted to the hood assembly by objects upon impact therebetween.

2. The hood assembly of claim 1, wherein said sinusoidal profile further includes a third amplitude and a third wavelength along a third region of the hood assembly different from said first and second regions, said third amplitude and wavelength each being configured to provide a third predetermined level of absorption and attenuation of kinetic energy imparted to the hood assembly by objects upon impact therebetween.

3. The hood assembly of claim 2, wherein said sinusoidal profile further includes a variable amplitude and a variable wavelength along a fourth region of the hood assembly different from said first, second, and third regions, said variable amplitude and wavelength each being configured to provide varying levels of absorption and attenuation of kinetic energy imparted to the hood assembly by objects upon impact therebetween.

4. The hood assembly of claim 3, wherein said first, second, and third wavelengths are each approximately 30 to 165 millimeters.

5. The hood assembly of claim 4, wherein said first, second, and third amplitudes are each approximately 5 to 30 millimeters.

6. A hood assembly for use with a vehicle, comprising:
   an upper layer having a first interface surface; and
   an inner layer having substantially opposing first and second surfaces defining a sinusoidal profile, wherein said first and second surfaces respectively define a first and a second plurality of bonding surfaces;
   wherein said first plurality of bonding surfaces is operatively attached to said first interface surface to thereby define a first plurality of channels oriented laterally with respect to said vehicle to improve crashworthiness of the vehicle in a frontal scenario;
   wherein said sinusoidal profile includes a first amplitude and a first wavelength along a first region of the hood assembly, said first amplitude and wavelength each being configured to provide a first predetermined level of absorption and attenuation of kinetic energy imparted to the hood assembly by objects upon impact therebetween;
   wherein said sinusoidal profile further includes a second amplitude and a second wavelength along a second region of the hood assembly different from said first region, said second amplitude and wavelength each being configured to provide a second predetermined level of absorption and attenuation of kinetic energy imparted to the hood assembly by objects upon impact therebetween.

7. The hood assembly of claim 6, wherein said sinusoidal profile further includes a third amplitude and a third wavelength along a third region of the hood assembly different from said first and second regions, said third amplitude and wavelength each being configured to provide a third predetermined level of absorption and attenuation of kinetic energy imparted to the hood assembly by objects upon impact therebetween.

8. The hood assembly of claim 7, wherein said sinusoidal profile further includes a variable amplitude and a variable wavelength along a fourth region of the hood assembly different from said first, second, and third regions, said variable amplitude and wavelength each being configured to provide varying levels of absorption and attenuation of kinetic energy imparted to the hood assembly by objects upon impact therebetween.

9. The hood assembly of claim 8, wherein said first, second, and third wavelengths are each approximately 30 to 165 millimeters, and wherein said first, second, and third amplitudes are each approximately 5 to 30 millimeters.

10. The hood assembly of claim 9, wherein said inner layer is configured to controllably deform at a first threshold crush load imparted to the hood assembly by objects upon impact therebetween.

11. The hood assembly of claim 10, wherein said inner layer is configured to controllably deform at said first threshold crush load via the addition of precuts or inclusions thereto.

12. The hood assembly of claim 11, further comprising:
   a lower layer having a second interface surface;
   wherein said second plurality of bonding surfaces of said inner layer is operatively attached to said second interface surface of said lower layer to thereby define a second plurality of channels oriented laterally with respect to said vehicle.

13. The hood assembly of claim 12, wherein said lower layer is configured to controllably fail at a second threshold crush load imparted to the hood assembly by objects upon impact therebetween.

14. The hood assembly of claim 13, wherein said lower layer is configured to controllably fail at said second threshold crush load via the addition of precuts or inclusions thereto.

15. The hood assembly of claim 14, wherein said upper layer, lower layer, and inner layer are each made from one of a metallic material and a plastic.

16. The hood assembly of claim 15, further comprising:
   a hood outer panel having an inner surface, wherein said upper layer is operatively secured to said inner surface of said hood outer panel.

17. A vehicle having a vehicle body defining a front compartment, the vehicle comprising:

a hood assembly configured to extend over and above the front compartment of the vehicle, said hood assembly including:

a hood outer panel having an inner surface;

an upper layer operatively secured to said inner surface of said hood outer panel and having a first interface surface;

a lower layer having a second interface surface; and an inner layer having substantially opposing first and second surfaces defining a sinusoidal profile, wherein said first and second surfaces also respectively define a first and a second plurality of bonding surfaces;

wherein said first plurality of bonding surfaces is operatively attached to said first interface surface of said upper layer and said second plurality of bonding surfaces is operatively attached to said second interface surface of said lower layer to respectively define a first and a second plurality of channels oriented laterally with respect to said vehicle;

wherein said sinusoidal profile defines a first amplitude and a first wavelength along a first region of said hood assembly, said first amplitude and wavelength each being configured to provide a first predetermined level of absorption and attenuation of kinetic energy imparted to said hood assembly by objects upon impact therebetween;

wherein said sinusoidal profile further defines a second amplitude and a second wavelength along a second region of said hood assembly different from said first region, said second amplitude and wavelength each being configured to provide a second predetermined level of absorption and attenuation of kinetic energy imparted to said hood assembly by objects upon impact therebetween; and wherein said sinusoidal profile further includes a third amplitude and a third wavelength along a third region of the hood assembly different from said first and second regions, said third amplitude and wavelength each configured to provide a third predetermined level of absorption and attenuation of kinetic energy imparted to the hood assembly by objects upon impact therebetween.

18. The vehicle of claim 17, wherein said first, second, and third wavelengths are each approximately 30 to 165 millimeters, and wherein said first, second, and third amplitudes are each approximately 5 to 30 millimeters.

19. The vehicle of claim 18, wherein said sinusoidal profile further defines a variable amplitude and a variable wavelength along a fourth region of said hood assembly different from said first, second and third regions, said variable amplitude and wavelength each configured to provide varying levels of absorption and attenuation of kinetic energy imparted to said hood assembly by objects upon impact therebetween.

20. The vehicle of claim 19, wherein said lower layer is configured to controllably fail at a first threshold crush load imparted to the hood assembly by objects upon impact therebetween.

21. The vehicle of claim 20, wherein said inner layer is configured to controllably deform at a second threshold crush load imparted to the hood assembly by objects upon impact therebetween.

22. The vehicle of claim 21, wherein said hood outer panel and said upper layer are preformed as a single unitary member.

* * * * *